US011425524B2

(12) United States Patent
Huang (10) Patent No.: US 11,425,524 B2
(45) Date of Patent: Aug. 23, 2022

(54) METHOD AND DEVICE FOR PROCESSING AUDIO SIGNAL (71) Applicant: BEIJING BYTEDANCE NETWORK TECHNOLOGY CO., LTD., Beijing (CN)

(72) Inventor: Chuanzeng Huang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 48 days.

(21) Appl. No.: 16/980,119

(22) PCT Filed: Jan. 24, 2019

(86) PCT No.: PCT/CN2019/072948
§ 371 (c)(1),
(2) Date: Sep. 11, 2020

(87) PCT Pub. No.: WO2020/073563
PCT Pub. Date: Apr. 16, 2020

(65) Prior Publication Data
US 2021/0029486 A1    Jan. 28, 2021

(30) Foreign Application Priority Data

Oct. 12, 2018   (CN) .......................... 201811190415.4

(51) Int. Cl.
*H03G 5/00*         (2006.01)
*H04S 7/00*         (2006.01)
(Continued)

(52) U.S. Cl.
CPC ............. *H04S 7/303* (2013.01); *G06N 3/084* (2013.01); *G06N 20/00* (2019.01); *G06T 7/74* (2017.01);
(Continued)

(58) Field of Classification Search
CPC .......... H04S 7/303; H04S 1/002; H04S 7/307; H04S 2400/13; H04S 2420/01;
(Continued)

(56) References Cited

U.S. PATENT DOCUMENTS 9,591,427 B1 *   3/2017   Lyren ...................... G06F 3/013
2003/0007648 A1   1/2003   Currell
(Continued)

FOREIGN PATENT DOCUMENTS

CN    102860041 A    1/2013
CN    104392241 A    3/2015
(Continued)

OTHER PUBLICATIONS

International Patent Application No. PCT/CN2019/072948; Int'l Search Report; dated Jun. 4, 2019; 2 pages.

*Primary Examiner* — Ammar T Hamid
(74) *Attorney, Agent, or Firm* — BakerHostetler (57) ABSTRACT

The embodiments of the present disclosure disclose a method and device for processing an audio signal. A specific embodiment of the method includes acquiring a head image of a target user and an audio signal to be processed; determining head attitude angles of the target user based on the head image, and determining a distance between a target sound source and the head of the target user; and inputting the head attitude angles, the distance and the audio signal to be processed into a preset head related transfer function to obtain a processed left channel audio signal and a processed right channel audio signal, wherein the head related transfer function is used to characterize a correspondence between the head attitude angles, the distance and the audio signal to be processed, and the processed left channel audio signal and the processed right channel audio signal.

15 Claims, 6 Drawing Sheets

(51) Int. Cl.
*G06T 7/73* (2017.01)
*G06N 20/00* (2019.01)
*G06N 3/08* (2006.01)
*H04S 1/00* (2006.01)
*H04R 1/40* (2006.01)

(52) U.S. Cl.
CPC .............. *H04S 1/002* (2013.01); *H04S 7/307* (2013.01); *G06T 2207/20081* (2013.01); *G06T 2207/20084* (2013.01); *G06T 2207/30196* (2013.01); *H04S 2400/13* (2013.01); *H04S 2420/01* (2013.01)

(58) Field of Classification Search
CPC ............. G06T 7/74; G06T 2207/20081; G06T 2207/20084; G06T 2207/30196; G06N 20/00; G06N 3/084
USPC ....................................................... 381/98, 97
See application file for complete search history.

(56) References Cited

U.S. PATENT DOCUMENTS

| | | |
|---|---|---|
| 2003/0169907 A1 | 9/2003 | Edwards et al. |
| 2012/0183148 A1 | 7/2012 | Cho et al. |
| 2021/0263309 A1* | 8/2021 | Rivera Cintron ....... G06F 1/163 |

FOREIGN PATENT DOCUMENTS

| | | |
|---|---|---|
| CN | 107168518 A | 9/2017 |
| CN | 107182011 A | 9/2017 |
| CN | 108038474 A | 5/2018 |
| JP | 2004-504684 A | 2/2004 |
| JP | 2014-131140 A | 7/2014 |
| JP | 2015-032844 A | 2/2015 |

* cited by examiner

METHOD AND DEVICE FOR PROCESSING AUDIO SIGNAL

CROSS-REFERENCE TO RELATED APPLICATION

This application is the U.S. National Stage of International Application No. PCT/CN2019/072948, filed on Jan. 24, 2019, which claims the priority of Chinese patent application No. 201811190415.4, filed on Oct. 12, 2018, which is incorporated herein by reference in its entirety.

TECHNICAL FIELD

The embodiments of the present disclosure relate to the field of computer technology, more particularly to a method and device for processing an audio signal.

BACKGROUND

As the integration of Internet and electronic technologies are getting tighter, people's requirements on intelligence and user-friendly properties of electronic devices are also increasing. Mobile phones and portable electronic terminals are more and more popularly used, and the multimedia function is one of the most common used applications for users.

At present, in the audio processing field, in order to simulate a sound field close to reality, a common used method is to adjust an interaural level difference of the left and right channels and adjust an interaural time difference of the left and right channels.

SUMMARY OF THE DISCLOSURE

The embodiments of the present disclosure propose a method and device for processing an audio signal.

In the first aspect, an embodiment of the present disclosure provides a method for processing an audio signal, comprising acquiring a head image of a target user and an audio signal to be processed; determining head attitude angles of the target user based on the head image, and determining a distance between a target sound source and the head of the target user; and inputting the head attitude angles, the distance and the audio signal to be processed into a preset head related transfer function to obtain a processed left channel audio signal and a processed right channel audio signal, wherein the head related transfer function is used to characterize a correspondence between the head attitude angles, the distance and the audio signal to be processed, and the processed left channel audio signal and the processed right channel audio signal.

In some embodiments, determining the head attitude angles of the target user based on the head image comprises: inputting the head image into a pre-trained head attitude recognition model to obtain the head attitude angles of the target user, wherein the head attitude recognition model is used to characterize a correspondence between the head image and the head attitude angles of the user characterized by the head image.

In some embodiments, the head attitude recognition model is obtained by pre-training according to the following steps: acquiring a plurality of sample head images and sample head attitude angles corresponding to sample head image in the plurality of sample head images; and carrying out training using a machine learning method with the sample head image in the plurality of sample head images as an input and the sample head attitude angles corresponding to the input sample head image as an expected output to obtain the head attitude recognition model.

In some embodiments, determining the distance between a target sound source and the head of the target user comprises: determining a size of the head image; and determining the distance between the target sound source and the head of the target user based on a preset correspondence between the size of the head image and the distance.

In some embodiments, after the processed left channel audio signal and the processed right channel audio signal are obtained, the method further comprises: acquiring a predetermined interaural level difference of an initial left channel audio signal and an initial right channel audio signal as an initial interaural level difference; and adjusting a loudness of the processed left channel audio signal and a loudness of the processed right channel audio signal respectively to allow a difference between an interaural level difference of the processed left channel audio signal and the processed right channel audio signal after loudness adjustment and the initial interaural level difference to be within a first preset range.

In some embodiments, the method further comprises: acquiring a predetermined interaural time difference of the initial left channel audio signal and the initial right channel audio signal as an initial interaural time difference; and adjusting an interaural time difference of the processed left channel audio signal and the processed right channel audio signal to allow a difference between an interaural time difference of the processed left channel audio signal and the processed right channel audio signal after interaural time difference adjustment and the initial interaural time difference to be within a second preset range.

In the second aspect, an embodiment of the present disclosure provides a device for processing an audio signal, comprising: a first acquisition unit configured to acquire a head image of a target user and an audio signal to be processed; a determination unit configured to determine head attitude angles of the target user based on the head image, and to determine a distance between a target sound source and the head of the target user; and a processing unit configured to input the head attitude angles, the distance and the audio signal to be processed into a preset head related transfer function to obtain a processed left channel audio signal and a processed right channel audio signal, wherein the head related transfer function is used to characterize a correspondence between the head attitude angles, the distance and the audio signal to be processed, and the processed left channel audio signal and the processed right channel audio signal.

In some embodiments, the determination unit comprises: a recognition module configured to input the head image into a pre-trained head attitude recognition model to obtain the head attitude angles of the target user, wherein the head attitude recognition model is used to characterize a correspondence between the head image and the head attitude angles of the user characterized by the head image.

In some embodiments, the head attitude recognition model is obtained by pre-training according to the following steps: acquiring a plurality of sample head images and sample head attitude angles corresponding to sample head image in the plurality of sample head images; and carrying out training using a machine learning method with the sample head image in the plurality of sample head images as an input and the sample head attitude angles corresponding to the input sample head image as an expected output to obtain the head attitude recognition model.

In some embodiments, the determination unit comprises: a first determination module configured to determine a size of the head image; and a second determination module configured to determine the distance between the target sound source and the head of the target user based on a preset correspondence between the size of the head image and the distance.

In some embodiments, the device further comprises: a second acquisition unit configured to acquire a predetermined interaural level difference of an initial left channel audio signal and an initial right channel audio signal as an initial interaural level difference; and a first adjustment unit configured to adjust a loudness of the processed left channel audio signal and a loudness of the processed right channel audio signal respectively to allow a difference between an interaural level difference of the processed left channel audio signal and the processed right channel audio signal after loudness adjustment and the initial interaural level difference to be within a first preset range.

In some embodiments, the device further comprises: a third acquisition unit configured to acquire a predetermined interaural time difference of the initial left channel audio signal and the initial right channel audio signal as an initial interaural time difference; and a second adjustment unit configured to adjust an interaural time difference of the processed left channel audio signal and the processed right channel audio signal to allow a difference between an interaural time difference of the processed left channel audio signal and the processed right channel audio signal after interaural time difference adjustment and the initial interaural time difference to be within a second preset range.

In the third aspect, an embodiment of the present disclosure provides a terminal equipment, the terminal equipment comprising: one or more processors; and a storage device with one or more programs stored therein, the one or more programs, when executed by the one or more processors, causing the one or more processors to implement the method described in any one of implementations in the first aspect.

In the fourth aspect, an embodiment of the present disclosure provides a computer readable storage medium with a computer program stored therein, wherein the program, when executed by a processor, causes the processor to implement the method described in any one of implementations in the first aspect.

According to the method and the device provided by an embodiment of the disclosure, the head image of the target user and the audio signal to be processed are acquired, then the head attitude angles of the target user and the distance between the target sound source and the head of the target user are determined based on the head image, and finally the head attitude angles, the distance and the audio signal to be processed are input into the preset head related transfer function to obtain the processed left channel audio signal and the processed right channel audio signal, so that the audio signal is adjusted using the head image and the head related transfer function, the processing of audio signals is more flexible, and the simulation for an audio playing effect close to reality is facilitated.

BRIEF DESCRIPTION OF THE DRAWINGS

Other features, objects, and advantages of the present disclosure will become apparent from the following detailed description of non-limiting embodiments with reference to the accompanying drawings, in which.

DETAILED DESCRIPTION

The present disclosure will be described in further detail below with reference to the accompanying drawings and embodiments. It is to be understood that the specific embodiments described herein are merely illustrative of the relevant disclosure and are not limiting of the disclosure. It is also to be noted that for ease of description, only those portions that are pertinent to the relevant disclosure are shown in the accompanying drawings.

It should be noted that the embodiments and features in the embodiments of the present disclosure may be combined with one another without conflict. The present disclosure will now be described in detail in conjunction with the embodiments with reference to the accompanying drawings.

Figure 1:
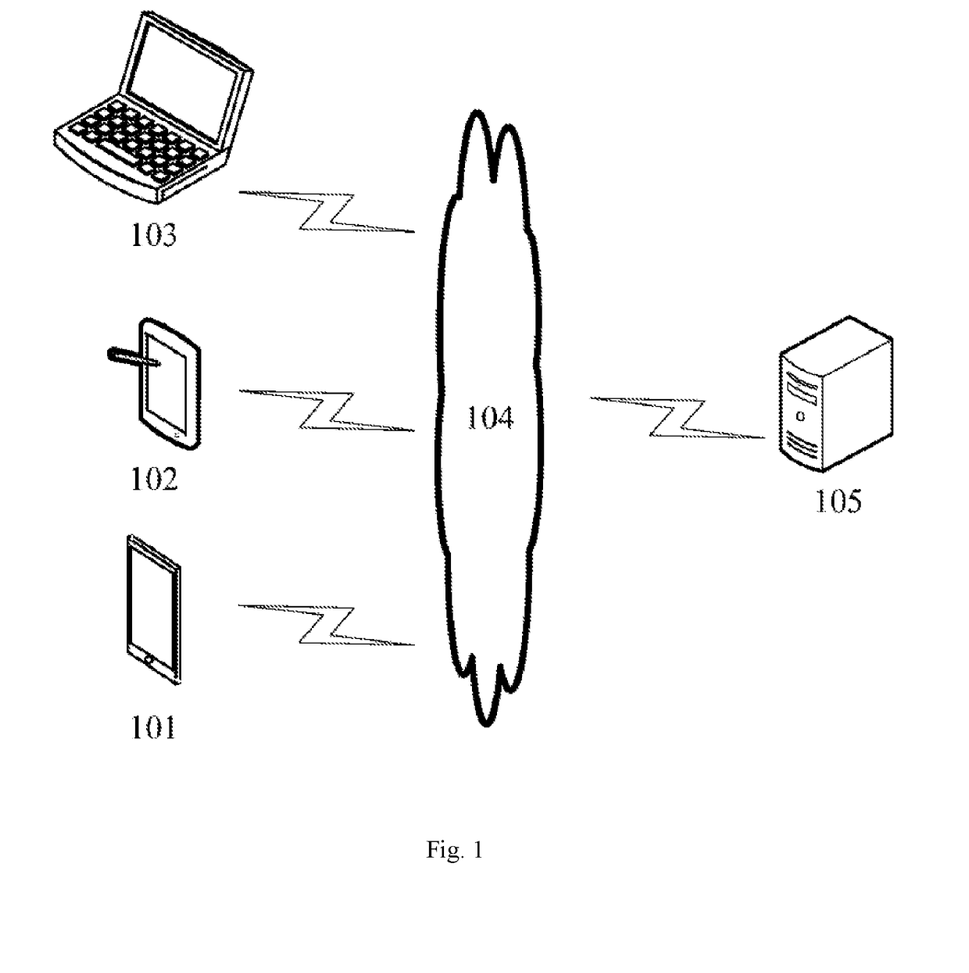
FIG. 1 is an architecture diagram illustrating an exemplary system to which an embodiment of the present disclosure may be applied.

FIG. 1 illustrates an exemplary system architecture 100 to which a method for processing an audio signal and a device for processing an audio signal of an embodiment of the present disclosure may be applied.

As shown in FIG. 1, system architecture 100 may comprise terminal equipment 101, 102 and 103, a network 104 and a server 105. The network 104 is used for providing a medium of a communication link between the terminal equipment 101, 102 and 103 and the server 105. The network 104 may comprise various connection types, such as wired and wireless communication links or an optical fiber.

The terminal equipment 101, 102 and 103 interact with the server 105 via the network 104 to receive or send messages. Various communication client applications, such as audio playback applications, video playback applications, and social platform software, can be installed in the terminal equipment 101, 102 and 103.

The terminal equipment 101, 102 and 103 may be hardware or software. When being hardware, the terminal equipment 101, 102 and 103 may be various kinds of electronic equipment capable of supporting audio playback and including a camera. When being software, the terminal equipment 101, 102 and 103 can be installed in the electronic equipment listed above. The terminal equipment may be implemented as a single piece of software or software modules, may also be implemented as multiple pieces of software or software module, such as multiple pieces of software or software modules used for providing distributed service, which is not limited herein.

The server 105 may be the one for providing various services, such as a backstage audio server for supporting audio to be played by the terminal equipment 101, 102 and 103. The audio may be sent to the terminal equipment by the backstage audio server and played on the terminal equipment.

It should be noted that a method for processing an audio signal provided by an embodiment of the present disclosure is generally executed by the terminal equipment 101, 102 and 103, and correspondingly, a device for processing the audio signal may be disposed in the terminal equipment 101, 102 and 103.

It should be noted that the server may be hardware or software. When being hardware, the server may be implemented as distributed server cluster composed of a plurality of server, may also be implemented as a single server. When being software, the server may be implemented as multiple pieces of software or software module, such as multiple pieces of software or software modules used for providing distributed service, may also be implemented as a single piece of software or software modules, which is not limited herein.

It should be understood that numbers of the terminal equipment, the network and the server in FIG. 1 are exemplary only. Any number of terminal equipment, networks and servers may be provided according to implementation requirements. In the case where the head image and audio signal to be processed do not need to be acquired from a remote location, the above system architecture may not include the network and the server.

Figure 2:
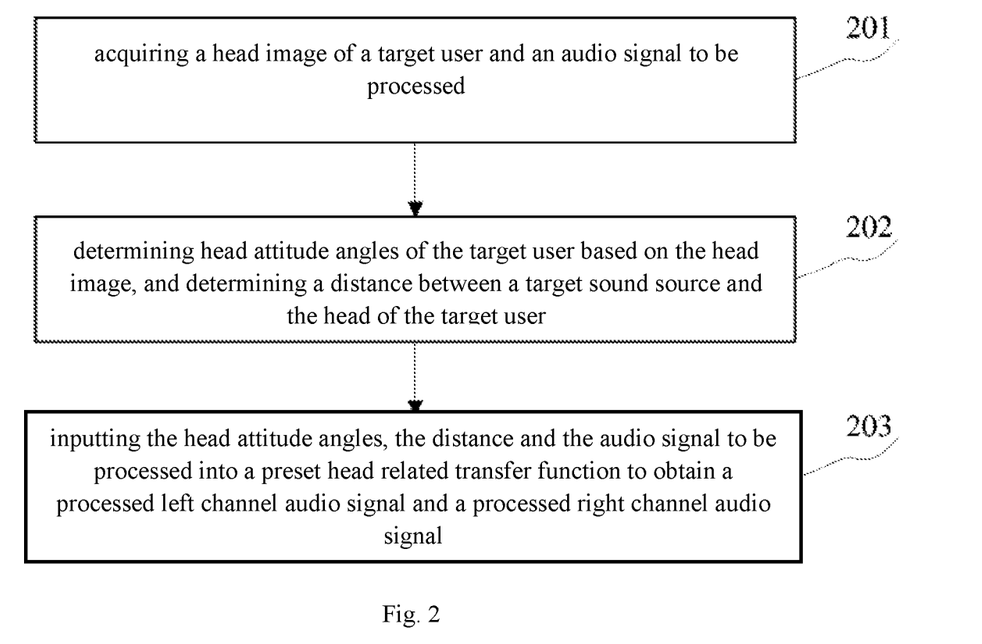
FIG. 2 is a flowchart of an embodiment of a method for processing an audio signal according to an embodiment of the present disclosure.

Continue to refer to FIG. 2, a process flow 200 of an embodiment of a method for processing an audio signal according to the present disclosure is shown. The method for processing the audio signal includes the following steps:

Step 201, a head image of a target user and an audio signal to be processed are acquired.

In this embodiment, an executive subject of the method for processing an audio signal, e.g., the terminal equipment shown in FIG. 1, may remotely or locally acquire a head image of a target user and a left channel audio signal to be processed and a right channel audio signal to be processed through a wired connection or a wireless connection. Among others, the target user may be a user within the coverage of a camera on the terminal equipment as shown in FIG. 1 (e.g., a user using the terminal equipment as shown in FIG. 1). The audio signal to be processed may be an audio signal that is previously stored in the executive subject and to be processed. As an example, the audio signal to be processed may be an audio clip which is included in an audio currently being played by the executive subject and has not yet been played. The audio clip may have a preset duration of, for example, 5 seconds, 10 seconds, etc.

Step 202, head attitude angles of the target user are determined, and a distance between a target sound source and the head of the target user is determined based on the head image.

In this embodiment, based on the head image acquired in step 201, the executive subject may determine the head attitude angles of the target user and determine the distance between the target sound source and the head of the target user. Among others, the head attitude angles may be used to characterize a degree of deflection of the front side of the face of target user relative to a camera for capturing the head image of the target user.

Figure 3:
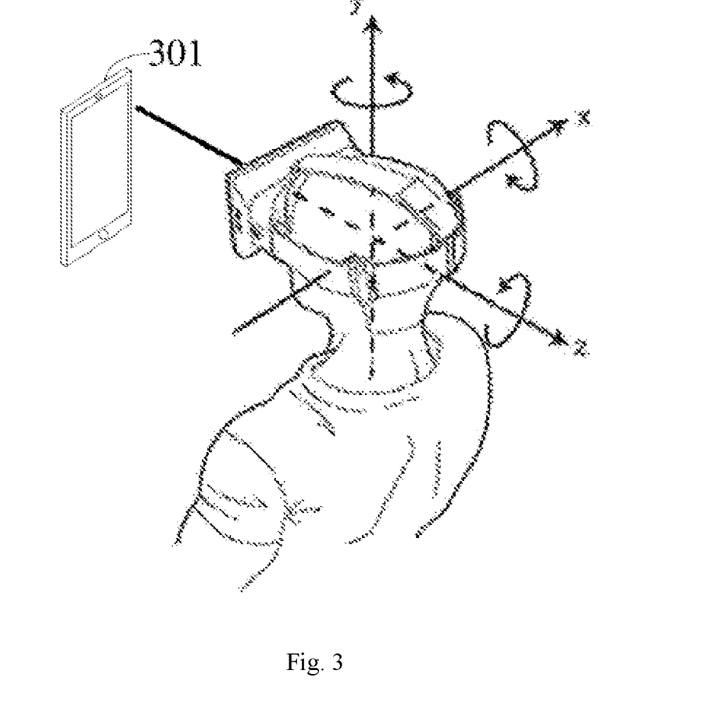
FIG. 3 is an exemplary schematic diagram of head attitude angles of the method for processing an audio signal according to an embodiment of the present disclosure.

In practice, the head attitude angles may include three angles of pitch, yaw and roll, representing the angles of turning in an up-down direction, turning in a left-right direction, and rotation in a horizontal plane, respectively. As shown in FIG. 3, the x-axis, y-axis, and z-axis are three axes of a rectangular coordinate system. Among others, the z-axis may be an optical axis of a camera on the terminal equipment 301, and the y-axis may be a straight line passing through a center point of the vertex contour of a person and perpendicular to a horizontal plane under the condition that the person does not turn his/her head sideways. The pitch angle may be an angle that the human face rotates about the x-axis, the yaw angle may be an angle that the human face rotates about the y-axis, and the roll angle may be an angle that the human face rotates about the z-axis. In the rectangular coordinate system in FIG. 3, when the person rotates his/her head, a ray starting from the origin of the rectangular coordinate system as an endpoint and passing through a midpoint of a line connecting center points of the two eyeballs of the person is determined, and angles of the ray with the x-axis, y-axis, and z-axis may be determined as the head attitude angles, respectively.

Figure 4:
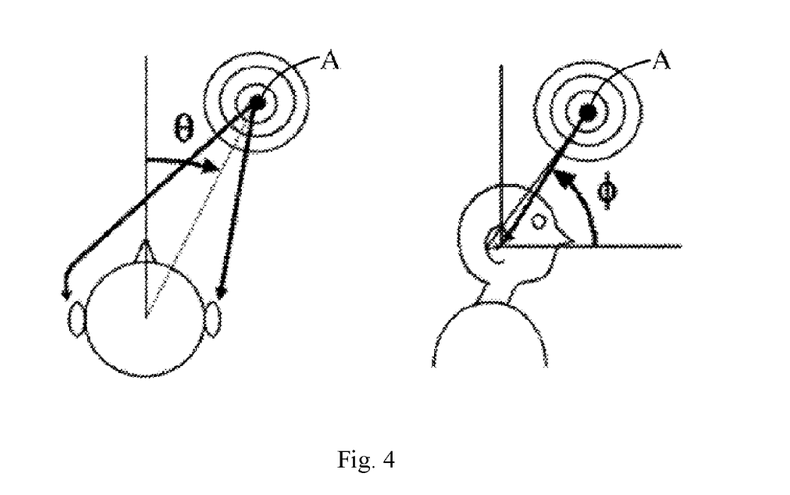
FIG. 4 is another exemplary schematic diagram of head attitude angles of the method for processing an audio signal according to an embodiment of the present disclosure.

It should be noted that in this embodiment, the determined head attitude angles may not include the roll angle described above. As shown in FIG. 4, the point A in the figure is the target sound source which is in the same location as the camera, and the determined head attitude angles include θ (yaw angle) and φ (pitch angle).

It should also be noted that the above executive subject may perform head attitude estimation on a two-dimensional head image according to various existing head attitude estimation methods. Among others, the head attitude estimation methods may include but are not limited to the following methods: machine learning model-based methods, human face key point-based coordinate transformation methods, etc.

In some alternative implementations of this embodiment, the executive subject may determine the head attitude angles of the target user based on the head image according to the following steps:

the head image is input into a pre-trained head attitude recognition model to obtain the head attitude angles of the target user. Among others, the head attitude recognition model is used to characterize a correspondence between the head image and the head attitude angles of the user characterized by the head image.

As an example, the head attitude recognition model described above may include a feature extraction part and a correspondence table. Among others, the feature extraction part may be used to extract features from the head image to generate feature vectors. For example, the feature extraction part may be a convolutional neural network, a depth neural network, etc. The correspondence table may be a correspondence table which is created in advance by a technician on the basis of statistics on massive feature vectors and head attitude angles, and stores therein a plurality of correspondences between the feature vectors and the head attitude angles. Thus, the head attitude recognition model described above may firstly extract features of the head image with the feature extraction part so as to generate a target feature vector. The target feature vector is then compared with a plurality of feature vectors in the correspondence table, and if a feature vector in the correspondence table is identical with or similar to the target feature vector, the head attitude angles corresponding to this feature vector in the correspondence table are taken as the head attitude angles of the target user.

In some alternative implementations of this embodiment, the head attitude recognition model may be pre-trained by the executive subject or other electronic device according to the following steps: firstly, a plurality of sample head images and sample head attitude angles corresponding to each sample head image in the plurality of sample head images are acquired. Among others, the sample head attitude angles are head attitude angles of the head of a person indicated by the sample head image, and the sample head image is annotated with the sample head attitude angles in advance. Then, training is carried out using a machine learning method with each sample head image in the plurality of sample head images as an input and the sample head attitude angles corresponding to the input sample head image as an expected output to obtain the head attitude recognition model.

The head attitude recognition model described above may be a model obtained by training an initialized artificial neural network. The initialized artificial neural network may be an untrained artificial neural network or an incomplete trained artificial neural network. Each layer of the initialized artificial neural network may be set with initial parameters which may be constantly adjusted during the training of the artificial neural network, e.g., a back propagation algorithm may be used to adjust the parameters. The initialized artificial neural network may be untrained or incomplete trained artificial neural networks of various types. For example, the initialized artificial neural network may be a convolutional neural network (e.g., which may include a convolutional layer, a pooling layer, a fully connected layer, etc.).

By determining the head attitude angles with the head image of the target user, the head attitude of the target user can be monitored in real time, and hardware such as a head-mounted device and the like can be omitted, so that the purposes of simplifying the hardware structure and reducing the hardware cost are achieved.

In this embodiment, the executive subject may determine the distance between the target sound source and the head of the target user based on the head image.

As an example, the executive subject may determine the distance between the target sound source and the head of the target user according to the following steps:

firstly, a size of the head image is determined. As an example, the size of the head image may be a size of a head image region recognized from the head image by the executive subject using an existing object detection model (e.g., SSD (Single Shot MultiBox Detector), DPM (Deformable Part Model), etc.). Among others, the size may be characterized in various ways. For example, it may be either the length or width of a smallest rectangle including the head image region, or the radius of a smallest circle including the head image region, etc.

Then, the distance between the target sound source and the head of the target user is determined based on a preset correspondence between the size of the head image and the distance. Specifically, as an example, the correspondence described above may be characterized by a preset correspondence table in which sizes of head images and corresponding distances may be stored, and the executive subject may look up a distance corresponding to the determined size of the head image from the correspondence table according to the determined size of the head image. As another example, the correspondence described above may be characterized according to a preset conversion formula, and the executive subject may calculate the distance between the target sound source and the head of the target user according to the determined size of the head image using the conversion formula. For example, the conversion formula may be $y=kx$, wherein k is a preset scale value, x is the size of the head image, and y is the distance between the target sound source and the head of the user characterized by the head image.

As another example, the executive subject may determine face key points in the head image using an existing face key point determining method, and determine the size of an image region including the determined face key points. Among others, the size of the image region may be characterized in the same way as in the example described above. Then, the executive subject may determine the distance between the target sound source and the head of the target user based on a preset correspondence between the size of the image region and the distance. Among others, the correspondence in this example may be characterized in the same way as in the example described above, and will not be described in detail here.

It is to be noted that the target sound source may be an actual electronic device outputting audio signals, and generally, the electronic device outputting audio signals is either the terminal equipment including a camera described above, or a virtual sound source at a target location determined by the executive subject. Correspondingly, the distance between the target sound source and the head of the target user may be a distance between the electronic unit outputting audio signals and the head of the target user determined according to the example described above; alternatively, the distance between the target sound source and the head of the target user may be a distance between the target sound source (i.e., the virtual sound source) and the head of the target user obtained by carrying out calculation (e.g., multiplying by a preset coefficient, or adding with a preset distance, etc.) on a determined distance.

Step 203, the head attitude angles, the distance and the audio signal to be processed are input into a preset head related transfer function to obtain a processed left channel audio signal and a processed right channel audio signal.

In this embodiment, the executive subject may input the head attitude angles, the distance and the audio signal to be processed into a preset Head Related Transfer Function (HRTF) to obtain a processed left channel audio signal and a processed right channel audio signal. Among others, the head related transfer function is used to characterize a correspondence between the head attitude angles, the distance and the audio signal to be processed, and the processed left channel audio signal and the processed right channel audio signal.

Specifically, the head related transfer function (also referred to as the binaural transfer function) describes a transfer process of sound waves from a sound source to two ears. It is a result of synthetic filtering of sound waves by human physiological structures such as the head, pinna, and torso. As containing information for locating the sound source, the head related transfer function is of great importance for the research in binaural hearing and psychoacoustics. In practical applications, various spatial auditory effects may be simulated with headphones or loudspeakers outputting signals processed using the head related transfer function.

In general, the HRTF may include two parts, i.e. a left HRTF and a right HRTF, and the executive subject may input the head attitude angles, the determined distance and the audio signal to be processed into the left HRTF and the right HRTF, and the left HRTF outputs a processed left channel audio signal while the right HRTF outputs a processed right channel audio signal. In practice, the processed left channel audio signal and the processed right channel audio signal may have an Interaural Level Difference (ILD) and an Interaural Time Difference (ITD). Among others, loudness, also called volume, describes the degree of sonority of sound, and reflects a subjective feeling of human ears to sound; the loudness is measured in a unit of sone, and one sone is defined as a loudness of a 1 kHz tone at 40 dB SPL. The interaural time difference refers to the difference in arrival time of a sound source to the two ears of a listener. Through the processing of the steps described above, the interaural level difference and the interaural time difference between the processed left channel audio signal and the processed right channel audio signal can be close to a real scene, and the simulation for an audio playing effect close to reality is facilitated.

Alternatively, after the processed left channel audio signal and the processed right channel audio signal are obtained, the executive subject may output the processed left channel audio signal and the processed right channel audio signal in various ways. For example, the processed left channel audio signal and the processed right channel audio signal may be played by devices such as earphones, loudspeakers and the like; alternatively, the processed left channel audio signal and the processed right channel audio signal may be output to a preset storage area for storage.

Figure 5:
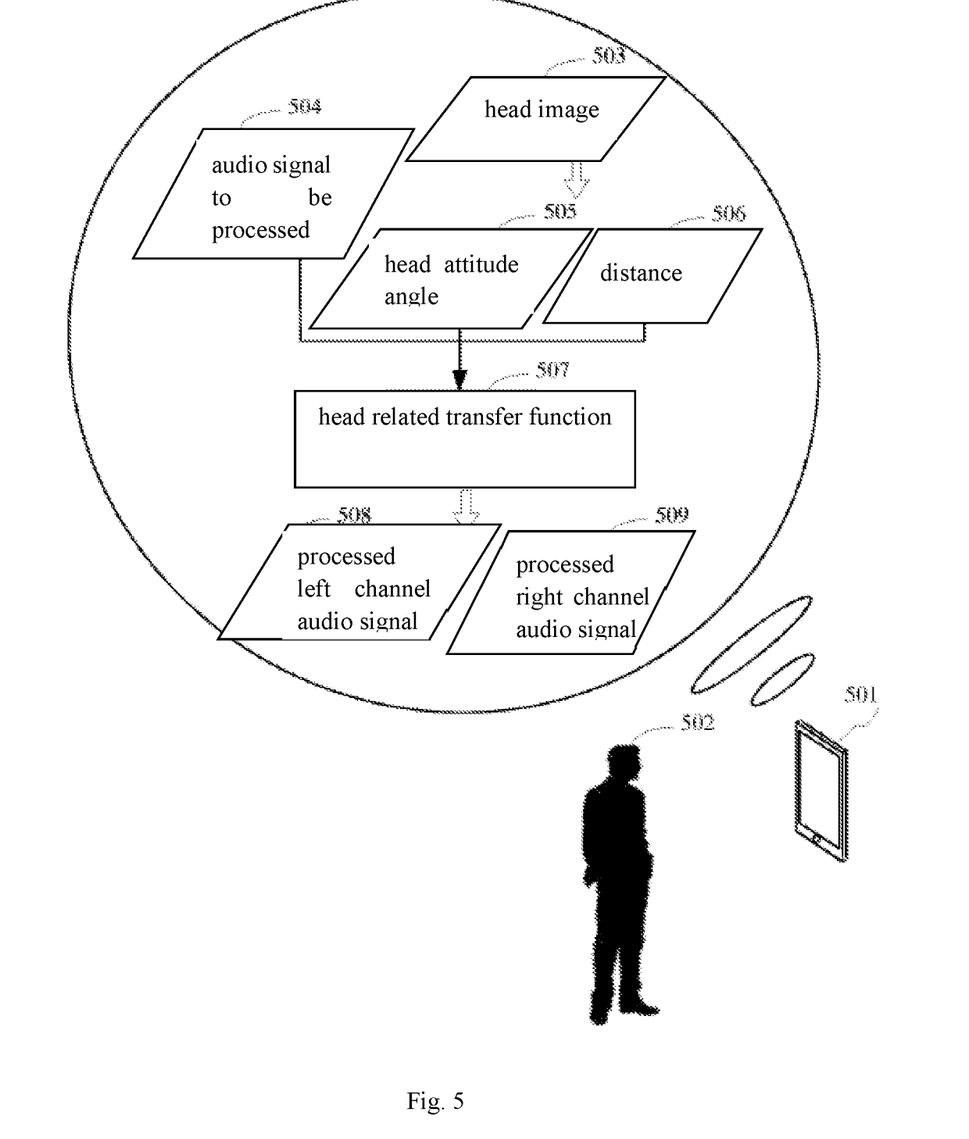
FIG. 5 is a schematic diagram of an application scenario of the method for processing an audio signal according to an embodiment of the present disclosure.

Continue to refer to FIG. 5, FIG. 5 is a schematic diagram of an application scenario of the method for processing an audio signal according to the present embodiment. In the application scenario of FIG. 5 where a terminal equipment 501 is playing music, the terminal equipment 501 firstly shoots a head image 503 of a target user 502, and then acquires an audio signal 504 to be processed. Among others, the audio signal 504 to be processed is an audio clip which is included in an audio currently being played and has not yet been played. The terminal equipment 501 then determines head attitude angles 505 of the target user (e.g., recognizes the head attitude angles using a pre-trained head attitude recognition model), and determines a distance 506 between a target sound source and the head of the target user 502 (e.g., determines the distance between the target sound source and the head of the target user based on a correspondence between the size of the image and the distance) based on the head image 503. Among others, the target sound source is the terminal equipment 501. Finally, the terminal equipment 501 inputs the head attitude angles 505, the distance 506 and the audio signal 504 to be processed into a preset head related transfer function 507 to obtain a processed left channel audio signal 508 and a processed right channel audio signal 509.

According to the method provided by the embodiment of the disclosure, the head image of the target user and the audio signal to be processed are acquired, then the head attitude angles of the target user and the distance between the target sound source and the head of the target user are determined based on the head image, and finally the head attitude angles, the distance and the audio signal to be processed are input into the preset head related transfer function to obtain the processed left channel audio signal and the processed right channel audio signal, so that the audio signal is adjusted using the head image and the head related transfer function, the processing of audio signals is more flexible, and the simulation for an audio playing effect close to reality is facilitated.

Figure 6:
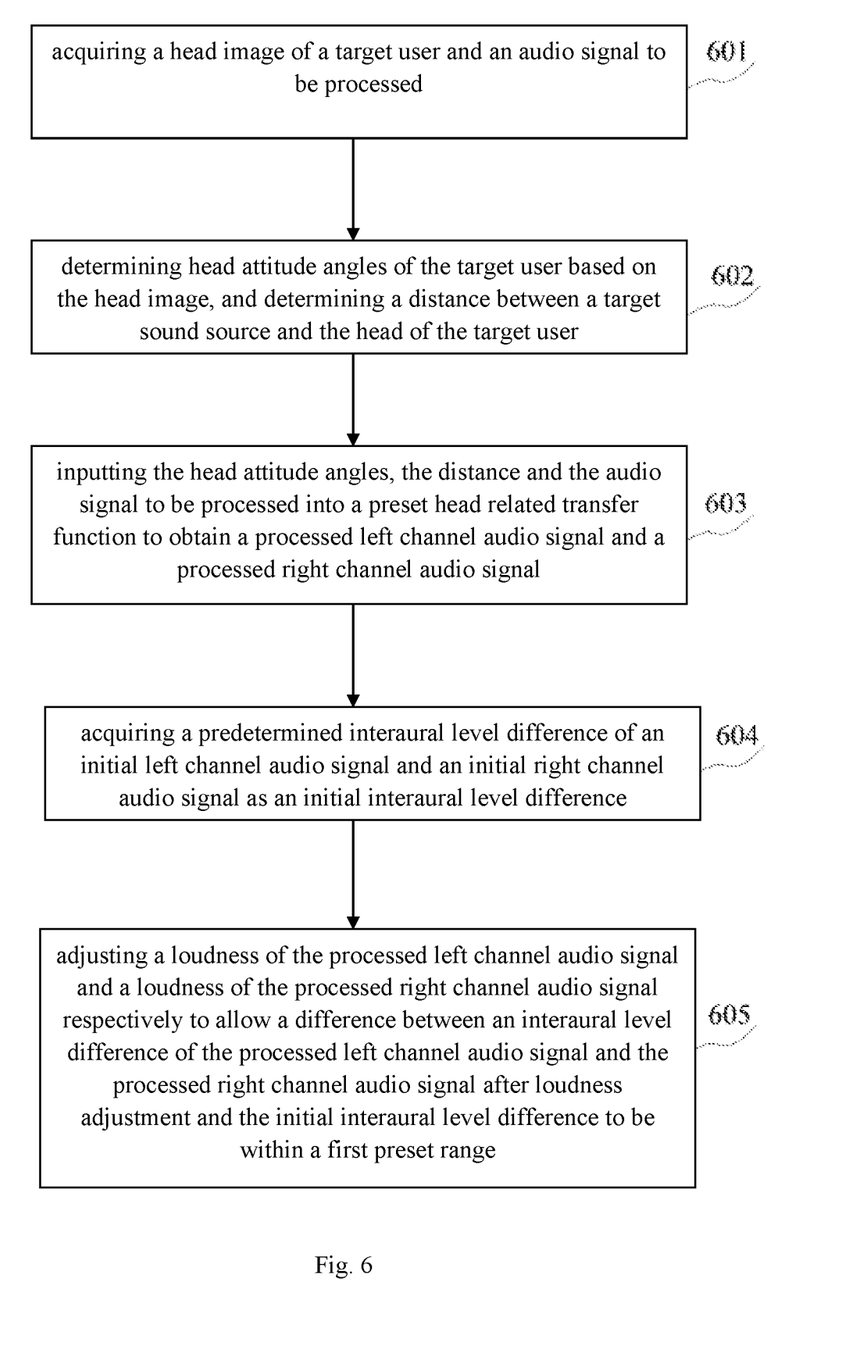
FIG. 6 is a flowchart of yet another embodiment of the method for processing an audio signal according to an embodiment of the present disclosure.

Further referring to FIG. 6, a process flow 600 of yet another embodiment of the method for processing an audio signal is shown. The process flow 600 of the method for processing an audio signal includes the following steps:

Step 601, a head image of a target user and an audio signal to be processed are acquired.

In this embodiment, step 601 is substantially identical to step 201 in the embodiment corresponding to FIG. 2 and will not be described in detail herein.

Step 602, head attitude angles of the target user are determined, and a distance between a target sound source and the head of the target user is determined based on the head image.

In this embodiment, step 602 is substantially identical to step 202 in the embodiment corresponding to FIG. 2 and will not be described in detail herein.

Step 603, the head attitude angles, the distance and the audio signal to be processed are input into a preset head related transfer function to obtain a processed left channel audio signal and a processed right channel audio signal.

In this embodiment, step 603 is substantially identical to step 203 in the embodiment corresponding to FIG. 2 and will not be described in detail herein.

Step 604, a predetermined interaural level difference of an initial left channel audio signal and an initial right channel audio signal is acquired as an initial interaural level difference.

In this embodiment, an executive subject of the method for processing an audio signal, e.g., the terminal equipment shown in FIG. 1, may acquire a predetermined interaural level difference of the initial left channel audio signal and the initial right channel audio signal. Among others, the initial left channel audio signal and the initial right channel audio signal may be unprocessed audio signals that have been stored in the executive subject in advance. The unprocessed audio signals and the afore-mentioned audio signal to be processed may be generated based on a same audio file. For example, the initial left channel audio signal and the initial right channel audio signal may be audio signals extracted from some audio file, and the audio signal to be processed may be an audio chip which is extracted from the audio file being played currently and has not yet been played.

In this embodiment, the executive subject may respectively determine a loudness of the initial left channel audio signal and a loudness of the initial right channel audio signal in advance, and determine a difference between the two determined loudnesses as the interaural level difference of the initial left channel audio signal and the initial right channel audio signal. It should be noted that the method for determining the loudness of an audio signal is a well-known technique that is currently widely studied and applied and will not be described in detail herein.

Step 605, a loudness of the processed left channel audio signal and a loudness of the processed right channel audio signal are respectively adjusted to allow a difference between an interaural level difference of the processed left channel audio signal and the processed right channel audio signal after loudness adjustment and the initial interaural level difference to be within a first preset range.

In this embodiment, the executive subject respectively adjusts the loudness of the processed left channel audio signal and the loudness of the processed right channel audio signal to allow the difference between an interaural level difference of the processed left channel audio signal and the processed right channel audio signal after loudness adjustment and the initial interaural level difference to be within a first preset range. Among others, the first preset range may be a preset interaural level difference range, such as 0 sone, ±1 sone, etc.

As an example, assuming that the initial left channel audio signal has a loudness of A and the initial right channel audio signal has a loudness of B, the loudness of the processed left channel audio signal is adjusted to close to A and the loudness of the processed right channel audio signal is adjusted to close to B so as to allow a difference between the interaural level difference of the processed left channel audio signal and the processed right channel audio signal after loudness adjustment and the initial interaural level difference to be within the first preset range.

By adjusting the loudness of the processed left channel audio signal and the loudness of the processed right channel audio signal, the interaural level difference of the processed left channel audio signal and the processed right channel audio signal can be restored to the initial interaural level difference, so that when the audio is played, the loudness of the audio signal can be prevented from changing abruptly.

In some alternative implementations of this embodiment, after step 603 described above, the executive subject may also perform the following steps:

firstly, a predetermined interaural time difference of the initial left channel audio signal and the initial right channel audio signal is acquired as an initial interaural time difference. Specifically, the initial left channel audio signal and the initial right channel audio signal are identical to the initial left channel audio signal and the initial right channel audio signal described in step 604 and will not be described in detail herein. The executive subject may determine the interaural time difference of the initial left channel audio signal and the initial right channel audio signal in advance according to an existing method for determining the interaural time difference of left and right channels. It should be noted that the method for determining the interaural time difference of left and right channels is a well-known technique that is currently widely studied and applied and will not be described in detail herein.

Then, an interaural time difference of the processed left channel audio signal and the processed right channel audio signal is adjusted to allow a difference between an interaural time difference of the processed left channel audio signal and the processed right channel audio signal after interaural time difference adjustment and the initial interaural time difference to be within a second preset range. Among others, the second preset range may be a preset interaural time difference range, e.g., 0 second, ±0.1 second, etc.

As an example, the purpose of adjusting the interaural time difference between the left channel audio signal and the processed right channel audio signal may be achieved by adjusting the start playing times of the processed left channel audio signal and the processed right channel audio signal. By adjusting the interaural time difference, the interaural time difference of the processed left channel audio signal and the processed right channel audio signal can be restored to the initial interaural time difference, so that when the audio is played, the interaural time difference of the audio signal can be prevented from changing abruptly, and the simulation of the real sound field may be facilitated. As can be seen from FIG. 6, in comparison with the embodiment corresponding to FIG. 2, the process flow 600 of the method for processing an audio signal in this embodiment highlights the step of adjusting the loudness of the processed left channel audio signal and the loudness of the processed right channel audio signal. By adopting the solution described in this embodiment, the loudness of the processed left channel audio signal and the loudness of the processed right channel audio signal can be restored to initial loudnesses, so that when the audio is played, the loudness of the audio signal can be prevented from changing abruptly.

Figure 7:
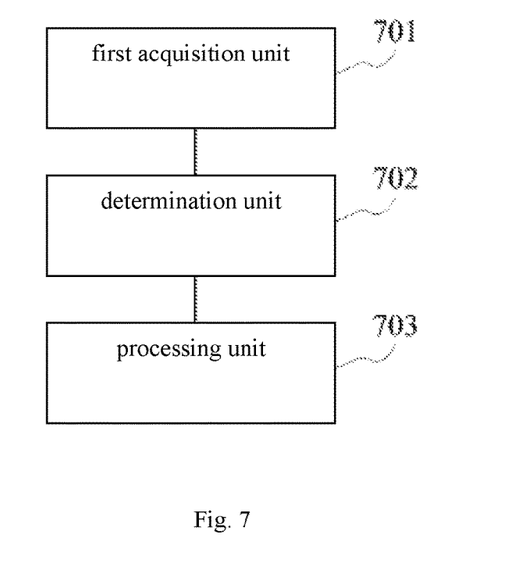
FIG. 7 is a structural schematic diagram of an embodiment of a device for processing an audio signal according to an embodiment of the present disclosure.

Referring further to FIG. 7, as an implementation of the methods illustrated in the figures described above, the present disclosure provides an embodiment of a device for processing an audio signal, the device corresponds to the method embodiment illustrated in FIG. 2, and may be particularly applicable to various electronic devices.

As shown in FIG. 7, the device 700 for processing an audio signal of this embodiment includes: a first acquisition unit 701 configured to acquire a head image of a target user and an audio signal to be processed; a determination unit 702 configured to determine head attitude angles of the target user, and to determine a distance between a target sound source and the head of the target user based on the head image; and a processing unit 703 configured to input the head attitude angles, the distance and the audio signal to be processed into a preset head related transfer function to obtain a processed left channel audio signal and a processed right channel audio signal, wherein, the head related transfer function is used to characterize a correspondence between the head attitude angles, the distance and the audio signal to be processed, and the processed left channel audio signal and the processed right channel audio signal.

In this embodiment, the first acquisition unit 701 may remotely or locally acquire a head image of a target user and a left channel audio signal to be processed and a right channel audio signal to be processed through a wired connection or a wireless connection. Among others, the target user may be a user within the coverage of a camera on the terminal equipment as shown in FIG. 1 (e.g., a user using the terminal equipment as shown in FIG. 1). The audio signal to be processed may be an audio signal that is has been stored in the device 700 in advance and to be processed. As an example, the audio signal to be processed may be an audio clip which is included in an audio currently being played by the device 700 and has not yet been played. The audio clip may have a preset duration of, for example, 5 seconds, 10 seconds, etc.

In this embodiment, the determination unit 702 may determine the head attitude angles of the target user and determine the distance between the target sound source and the head of the target user. Among others, the head attitude angles may be used to characterize a degree of deflection of the front side of the face of target user relative to a camera for capturing the head image of the target user.

It should also be noted that the determination unit 702 may perform head attitude estimation on a two-dimensional head image according to various existing head attitude estimation methods. Among others, the head attitude estimation methods may include but are not limited to the following methods: machine learning model-based methods, human face key point-based coordinate transformation methods, etc.

In this embodiment, the determination unit 702 may determine the distance between the target sound source and the head of the target user based on the head image. As an example, the determination unit 702 may determine face key points in the head image using an existing face key point determining method, and determine the size of an image region including the determined face key points. Then, the determination unit 702 may determine the distance between the target sound source and the head of the target user based on a preset correspondence between the size of the image region and the distance.

It should be noted that the target sound source may be an actual electronic device outputting audio signals, and generally, the electronic device outputting audio signals is either the terminal equipment including a camera described above, or a virtual sound source at a target location and determined by the executive subject. Correspondingly, the distance between the target sound source and the head of the target user may be a distance between the electronic unit outputting audio signals and the head of the target user determined according to the example described above; alternatively, the distance between the target sound source and the head of the target user may be a distance between the target sound source (i.e., the virtual sound source) and the head of the target user obtained by carrying out calculation (e.g., multiplying by a preset coefficient, or adding with a preset distance, etc.) on the determined distance.

In this embodiment, the processing unit 703 may input the head attitude angles, the distance and the audio signal to be processed into a preset Head Related Transfer Function (HRTF) to obtain a processed left channel audio signal and a processed right channel audio signal. Among others, the head related transfer function is used to characterize a correspondence between the head attitude angles, the distance and the audio signal to be processed, and the processed left channel audio signal and the processed right channel audio signal.

Specifically, the head related transfer function (also known as the binaural transfer function) describes a transfer process of sound waves from a sound source to two ears. It is a result of synthetic filtering of sound waves by human physiological structures such as the head, pinna, and torso. As containing information for locating the sound source, the head related transfer function is of great importance for the research in binaural hearing and psychoacoustics. In practical applications, various spatial auditory effects may be simulated through outputting signals processed by the head related transfer function with headphones or loudspeakers.

In general, the HRTF may include two parts, i.e. a left HRTF and a right HRTF, and the processing unit 703 may input the head attitude angles, the determined distance and the audio signal to be processed into the left HRTF and the right HRTF, and the left HRTF outputs a processed left channel audio signal while the right HRTF outputs a processed right channel audio signal. In practice, the processed left channel audio signal and the processed right channel audio signal may have an Interaural Level Difference (ILD) and an Interaural Time Difference (ITD). Among others, loudness, also called volume, describes the degree of sonority of sound, and reflects a subjective feeling of human ears to sound; the loudness is measured in a unit of sone, and one sone is defined as a loudness of a 1 kHz tone at 40 dB SPL. The interaural time difference refers to the difference in arrival time of a sound source to two ears of a listener. Through the processing of the steps described above, the interaural level difference and the interaural time difference between the processed left channel audio signal and the processed right channel audio signal can be close to a real scene, and the simulation for an audio playing effect close to reality is facilitated.

In some alternative implementations of this embodiment, the determination unit 702 may include: a recognition module (not shown in the figure) configured to input the head image into a pre-trained head attitude recognition model to obtain the head attitude angles of the target user, wherein the head attitude recognition model is used to characterize a correspondence between the head image and the head attitude angles of the user characterized by the head image.

In some alternative implementations of this embodiment, the head attitude recognition model may be pre-trained by the following steps: a plurality of sample head images and sample head attitude angles corresponding to sample head image in the plurality of sample head images are acquired; and training is carried out using a machine learning method with the sample head image in the plurality of sample head images as an input and the sample head attitude angles corresponding to the input sample head image as an expected output to obtain the head attitude recognition model.

In some alternative implementations of this embodiment, the determination unit 702 may include: a first determination module (not shown in the figure) configured to determine a size of the head image; and a second determination module (not shown in the figure) configured to determine the distance between the target sound source and the head of the target user based on a preset correspondence between the size of the head image and the distance.

In some alternative implementations of this embodiment, the device 700 may further include: a second acquisition unit (not shown in the figure) configured to acquire a predetermined interaural level difference of an initial left channel audio signal and an initial right channel audio signal as an initial interaural level difference; and a first adjustment unit (not shown in the figure) configured to respectively adjust a loudness of the processed left channel audio signal and a loudness of the processed right channel audio signal to allow a difference between an interaural level difference of the processed left channel audio signal and the processed right channel audio signal after loudness adjustment and the initial interaural level difference to be within a first preset range.

In some alternative implementations of this embodiment, the device 700 may further include: a third acquisition unit (not shown in the figure) configured to acquire a predetermined interaural time difference of the initial left channel audio signal and the initial right channel audio signal as an initial interaural time difference; and a second adjustment unit configured to adjust an interaural time difference of the processed left channel audio signal and the processed right channel audio signal to allow a difference between an interaural time difference of the processed left channel audio signal and the processed right channel audio signal after interaural time difference adjustment and the initial interaural time difference to be within a second preset range.

According to the device provided by the embodiment of the disclosure, the head image of the target user and the audio signal to be processed are acquired, then the head attitude angles of the target user and the distance between the target sound source and the head of the target user are determined based on the head image, and finally the head attitude angles, the distance and the audio signal to be processed are input into the preset head related transfer function to obtain the processed left channel audio signal and the processed right channel audio signal, so that the audio signal is adjusted using the head image and the head related transfer function, the processing of audio signals is more flexible, and the simulation for an audio playing effect close to reality is facilitated.

Figure 8:
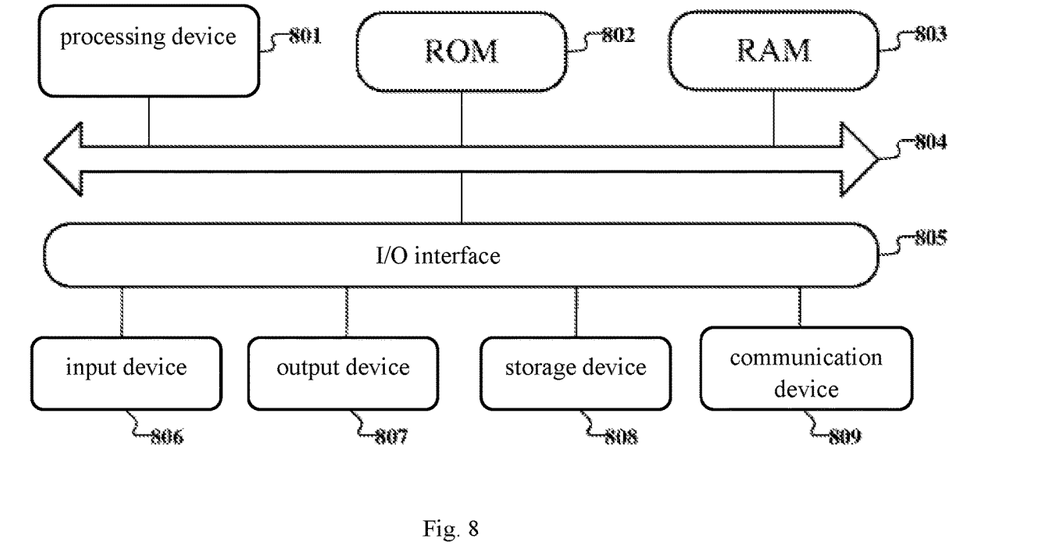
FIG. 8 is a structural schematic diagram of a terminal equipment suitable for implementing an embodiment of the present disclosure.

Reference is now made to FIG. 8 which shows a structure schematic diagram of a terminal equipment 800 applicable to implementing an embodiment of the present disclosure. The terminal equipment in the embodiments of the present disclosure may include, but are not limited to, mobile terminals such as mobile phones, notebook computers, digital broadcast receivers, PDAs (personal digital assistants), PADs (tablet computers), PMPs (portable multimedia players), and in-vehicle terminals (for example, car navigation terminals) and fixed terminals such as digital TVs, desktop computers, and the like. The terminal equipment shown in FIG. 8 is merely an example and should not pose any limitation on functions and application ranges of the embodiments of the present disclosure.

As shown in FIG. 8, the terminal equipment 800 comprises a processing device 801 such as a central processing unit (CPU) which can execute various appropriate actions and processes according to programs stored in a read-only memory (ROM) 802 or programs loaded to a random-access memory (RAM) 803 from a storage device 808. Various programs and data required by operation of the terminal equipment 800 are also stored in the RANI 803. The processing device 801, ROM 802 and RAM 803 are connected to one another through a bus 804. An input/output (I/O) interface 805 is also connected to the bus 804.

The I/O interface 805 is connected with following devices: an input device 806 including a touch screen, touch pad, keyboard, mouse, camera, microphone, accelerometer, gyroscope, etc.; an output device 807 including a liquid crystal display (LCD), a loudspeaker, vibrator, etc.; a storage device 808 including a disk, a hard disk, etc.; and a communication device 809. The communication device 809 may allow the terminal equipment 800 to perform wireless or wired communication with other equipment to exchange data. Although FIG. 8 shows the terminal equipment 800 having various devices, it should be understood that it is not required to implement or have all the devices shown. More or fewer devices may be implemented or provided instead.

Specifically, processes described above with reference to flowcharts may be implemented as computer software programs in accordance with embodiments of the present disclosure. For example, an embodiment of the present disclosure comprises a computer program product which comprises a computer program carried on a computer readable medium, and the computer program comprises program codes used for executing the method shown in the flowchart. In such embodiment, the computer program may be downloaded from the network through the communication device 809 and installed, and/or downloaded from the storage device 808 and installed, and/or downloaded from the ROM 802 and installed. When the computer program is executed by the processing device 801, the function defined in the method provided by the present disclosure is executed.

It should be noted that the computer readable medium of the present disclosure may be a computer readable signal medium or a computer readable storage medium, or any combination of the computer readable signal medium or the computer readable storage medium. The computer readable storage medium may be, for example, but is not limited to, an electronic, magnetic, optical, electromagnetic, infrared, or semiconductor system, apparatus, or device, or combination of any of the above. More specifically, the computer readable storage medium may include, but is not limited to, an electrical connector having one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination of the above. In the present disclosure, the computer readable storage medium may be any tangible medium that contains or stores a program that can be used by or in combination with an instruction execution system, apparatus, or device. In the present disclosure, the computer readable signal medium may include a data signal propagating in a baseband or as a part of a carrier wave, wherein computer readable program codes are carried in the data signal. Such propagated data signal may be in various forms, including but not limited to an electromagnetic signal, an optical signal, or any appropriate combination of the above. The computer readable signal medium may also be any computer readable medium other than the computer readable storage medium, and the computer readable medium can transmit, propagate, or transport the program used by or in combination with the instruction execution system, apparatus, or device. The program codes included in the computer readable medium may be transmitted via any appropriate medium, including but not limited to electrical wires, optical cables, RF, etc., or any appropriate combination of the above.

The above-mentioned computer-readable medium may be included in the above-mentioned terminal equipment; or it may exist alone without being assembled into the terminal equipment. The above computer readable medium carries one or more programs. When the above one or more programs are executed by the terminal equipment, the terminal equipment is caused to: acquire the head image of the target user and the audio signal to be processed; based on the head image, determine the head attitude angle of the target user, and determine the distance between the target sound source and the head of the target user; input the head attitude angle, the distance, and the audio signal to be processed into a preset head-related transfer function to obtain the processed left channel audio signal and processed right channel audio signal, wherein the head-related transfer function is used to characterize the correspondence between the head attitude angle, the distance, the audio signal to be processed and the processed left channel audio signal and the processed right channel audio signal.

The computer program codes for carrying out operation of the present disclosure may be written by one or more programming languages, or a combination thereof, the programming languages include object oriented programming languages, such as Java, Smalltalk, C++, as well as conventional procedural programming languages, such as a "C" language or similar programming languages. The program codes may be executed entirely on a user computer, or partly on the user computer, or as a separate software package, or partly on the user computer and partly on a remote computer, or entirely on the remote computer or the server. In situations involving the remote computer, the remote computer may be connected to the user computer through any kind of network, including a local area network (LAN) or a wide area network (WAN), or may be connected to an external computer (for example through the Internet by virtue of an Internet service provider).

The flowcharts and block diagrams in the figures illustrate the possible system architecture, functions, and operation according to systems, methods, and computer program products of various embodiments of the present disclosure. In view of this, each block in the flowcharts or block diagrams may represent a module, a program segment, or a portion of codes, and the module, the program segment or the portion of codes contains one or more executable instructions for implementing specified logical functions. It should also be noted that in some alternative implementations, the functions labeled in the blocks may be implemented according to an order different from the order labeled in the figures. For example, the two blocks shown in succession may, in fact, be executed substantially concurrently, or may sometimes be executed in a reverse order, depending upon the functions involved. It should also be noted that each block in the block diagrams and/or flowcharts, and combinations of blocks in the block diagrams and/or flowcharts can be implemented by dedicated hardware-based systems used for carrying out the specified functions or operation, or can be implemented by combinations of dedicated hardware and computer instructions.

Units described in the embodiments of the present disclosure may be implemented in a software mode or in a hardware mode. Among others, the names of the units do not, in some cases, constitute limitation on the units themselves, for example, the first acquisition unit can also be described as "a unit that acquires the head image of the target user and the audio signal to be processed".

The above description is merely the illustration of preferred embodiments of the present disclosure and the technical principles used. It should be understood by those skilled in the art that the scope of the present disclosure referred to herein is not limited to technical solutions formed by specific combinations of the above technical features, but also contains other technical solutions formed by any combination of the above technical features or equivalent features thereof without departing from the above inventive concept. For example, technical solutions formed by interchanging the above features with (but not limited to) the technical features with similar functions disclosed in the present disclosure.

The invention claimed is:

1. A method for processing an audio signal, comprising:
acquiring a head image of a target user and an audio signal to be processed;
determining head attitude angles of the target user based on the head image;
determining a distance between a target sound source and the head of the target user, wherein the determining a distance between a target sound source and the head of the target user further comprises:
determining a size of the head image, and
determining the distance between the target sound source and the head of the target user based at least in part on the size of the head image;
obtaining a processed left channel audio signal and a processed right channel audio signal by inputting the head attitude angles, the distance between the target sound source and the head of the target user, and the audio signal to be processed into a preset head related transfer function, wherein the preset head related transfer function is configured to characterize a correspondence between the head attitude angles, the distance and the audio signal to be processed, and the processed left channel audio signal and the processed right channel audio signal; and
outputting the processed left channel audio signal and the processed right channel audio signal.

2. The method according to claim 1, wherein determining the head attitude angles of the target user based on the head image comprises:
inputting the head image into a pre-trained head attitude recognition model to obtain the head attitude angles of the target user, wherein the head attitude recognition model is used to characterize a correspondence between the head image and the head attitude angles of the user characterized by the head image.

3. The method according to claim 2, wherein the head attitude recognition model is obtained by pre-training according to the following steps:
acquiring a plurality of sample head images and sample head attitude angles corresponding to sample head image in the plurality of sample head images; and
carrying out training using a machine learning method with the sample head image in the plurality of sample head images as an input and the sample head attitude angles corresponding to the input sample head image as an expected output to obtain the head attitude recognition model.

4. The method according to claim 1, wherein after the processed left channel audio signal and the processed right channel audio signal are obtained, the method further comprises:
acquiring a predetermined interaural level difference of an initial left channel audio signal and an initial right channel audio signal as an initial interaural level difference; and
adjusting a loudness of the processed left channel audio signal and a loudness of the processed right channel audio signal respectively to allow a difference between an interaural level difference of the processed left channel audio signal and the processed right channel audio signal after loudness adjustment and the initial interaural level difference to be within a first preset range.

5. The method according to claim 4, wherein the method further comprises:
acquiring a predetermined interaural time difference of the initial left channel audio signal and the initial right channel audio signal as an initial interaural time difference; and
adjusting an interaural time difference of the processed left channel audio signal and the processed right channel audio signal to allow a difference between an interaural time difference of the processed left channel audio signal and the processed right channel audio signal after interaural time difference adjustment and the initial interaural time difference to be within a second preset range.

6. A device for processing an audio signal, comprising:
a memory configured to store executable instructions;
a processor configured to implement a method for processing an audio signal when executing the executable instructions stored in the memory;
wherein the method for processing an audio signal comprising:
acquiring a head image of a target user and an audio signal to be processed;
determining head attitude angles of the target user based on the head image;
determining a distance between a target sound source and the head of the target user, wherein the determining a distance between a target sound source and the head of the target user further comprises:
determining a size of the head image, and
determining the distance between the target sound source and the head of the target user based at least in part on the size of the head image;
obtaining a processed left channel audio signal and a processed right channel audio signal by inputting the head attitude angles, the distance between the target sound source and the head of the target user, and the audio signal to be processed into a preset head related transfer function, wherein the preset head related transfer function is configured to characterize a correspondence between the head attitude angles, the distance and the audio signal to be processed, and the processed left channel audio signal and the processed right channel audio signal; and outputting the processed left channel audio signal and the processed right channel audio signal.

7. The device according to claim 6, wherein determining the head attitude angles of the target user based on the head image comprises:
   inputting the head image into a pre-trained head attitude recognition model to obtain the head attitude angles of the target user, wherein the head attitude recognition model is used to characterize a correspondence between the head image and the head attitude angles of the user characterized by the head image.

8. The device according to claim 7, wherein the head attitude recognition model is obtained by pre-training according to the following steps:
   acquiring a plurality of sample head images and sample head attitude angles corresponding to sample head image in the plurality of sample head images; and
   carrying out training using a machine learning method with the sample head image in the plurality of sample head images as an input and the sample head attitude angles corresponding to the input sample head image as an expected output to obtain the head attitude recognition model.

9. The device according to claim 6, wherein after the processed left channel audio signal and the processed right channel audio signal are obtained, the method further comprises:
   acquiring a predetermined interaural level difference of an initial left channel audio signal and an initial right channel audio signal as an initial interaural level difference; and
   adjusting a loudness of the processed left channel audio signal and a loudness of the processed right channel audio signal respectively to allow a difference between an interaural level difference of the processed left channel audio signal and the processed right channel audio signal after loudness adjustment and the initial interaural level difference to be within a first preset range.

10. The device according to claim 9, wherein the method further comprises:
    acquiring a predetermined interaural time difference of the initial left channel audio signal and the initial right channel audio signal as an initial interaural time difference; and
    adjusting a interaural time difference of the processed left channel audio signal and the processed right channel audio signal to allow a difference between an interaural time difference of the processed left channel audio signal and the processed right channel audio signal after interaural time difference adjustment and the initial interaural time difference to be within a second preset range.

11. A non-transitory computer readable storage medium with a computer program stored therein, wherein the program, when executed by a processor, causes the processor to implement a method for processing an audio signal,
    wherein the method for processing an audio signal comprising:
    acquiring a head image of a target user and an audio signal to be processed;
    determining head attitude angles of the target user based on the head image;
    determining a distance between a target sound source and the head of the target user, wherein the determining a distance between a target sound source and the head of the target user further comprises:
    determining a size of the head image, and
    determining the distance between the target sound source and the head of the target user based at least in part on the size of the head image;
    obtaining a processed left channel audio signal and a processed right channel audio signal by inputting the head attitude angles, the distance between the target sound source and the head of the target user, and the audio signal to be processed into a preset head related transfer function, wherein the preset head related transfer function is configured to characterize a correspondence between the head attitude angles, the distance and the audio signal to be processed, and the processed left channel audio signal and the processed right channel audio signal; and
    outputting the processed left channel audio signal and the processed right channel audio signal.

12. The non-transitory computer readable storage medium according to claim 11, wherein determining the head attitude angles of the target user based on the head image comprises:
    inputting the head image into a pre-trained head attitude recognition model to obtain the head attitude angles of the target user, wherein the head attitude recognition model is used to characterize a correspondence between the head image and the head attitude angles of the user characterized by the head image.

13. The non-transitory computer readable storage medium according to claim 12, wherein the head attitude recognition model is obtained by pre-training according to the following steps:
    acquiring a plurality of sample head images and sample head attitude angles corresponding to sample head image in the plurality of sample head images; and
    carrying out training using a machine learning method with the sample head image in the plurality of sample head images as an input and the sample head attitude angles corresponding to the input sample head image as an expected output to obtain the head attitude recognition model.

14. The non-transitory computer readable storage medium according to claim 11, wherein after the processed left channel audio signal and the processed right channel audio signal are obtained, the method further comprises:
    acquiring a predetermined interaural level difference of an initial left channel audio signal and an initial right channel audio signal as an initial interaural level difference; and
    adjusting a loudness of the processed left channel audio signal and a loudness of the processed right channel audio signal respectively to allow a difference between an interaural level difference of the processed left channel audio signal and the processed right channel audio signal after loudness adjustment and the initial interaural level difference to be within a first preset range.

15. The non-transitory computer readable storage medium according to claim 14, wherein the method further comprises:
    acquiring a predetermined interaural time difference of the initial left channel audio signal and the initial right channel audio signal as an initial interaural time difference; and
    adjusting an interaural time difference of the processed left channel audio signal and the processed right channel audio signal to allow a difference between an interaural time difference of the processed left channel audio signal and the processed right channel audio signal after interaural time difference adjustment and the initial interaural time difference to be within a second preset range.

\* \* \* \* \*